May 31, 1966  J. R. SCHUETZ  3,253,669

TRANSMISSION AND LEVELING CONTROLS FOR VEHICLES

Filed April 13, 1964  3 Sheets-Sheet 1

INVENTOR.
JOHN R. SCHUETZ
BY
Blair, Freeman & Molinare
Attys.

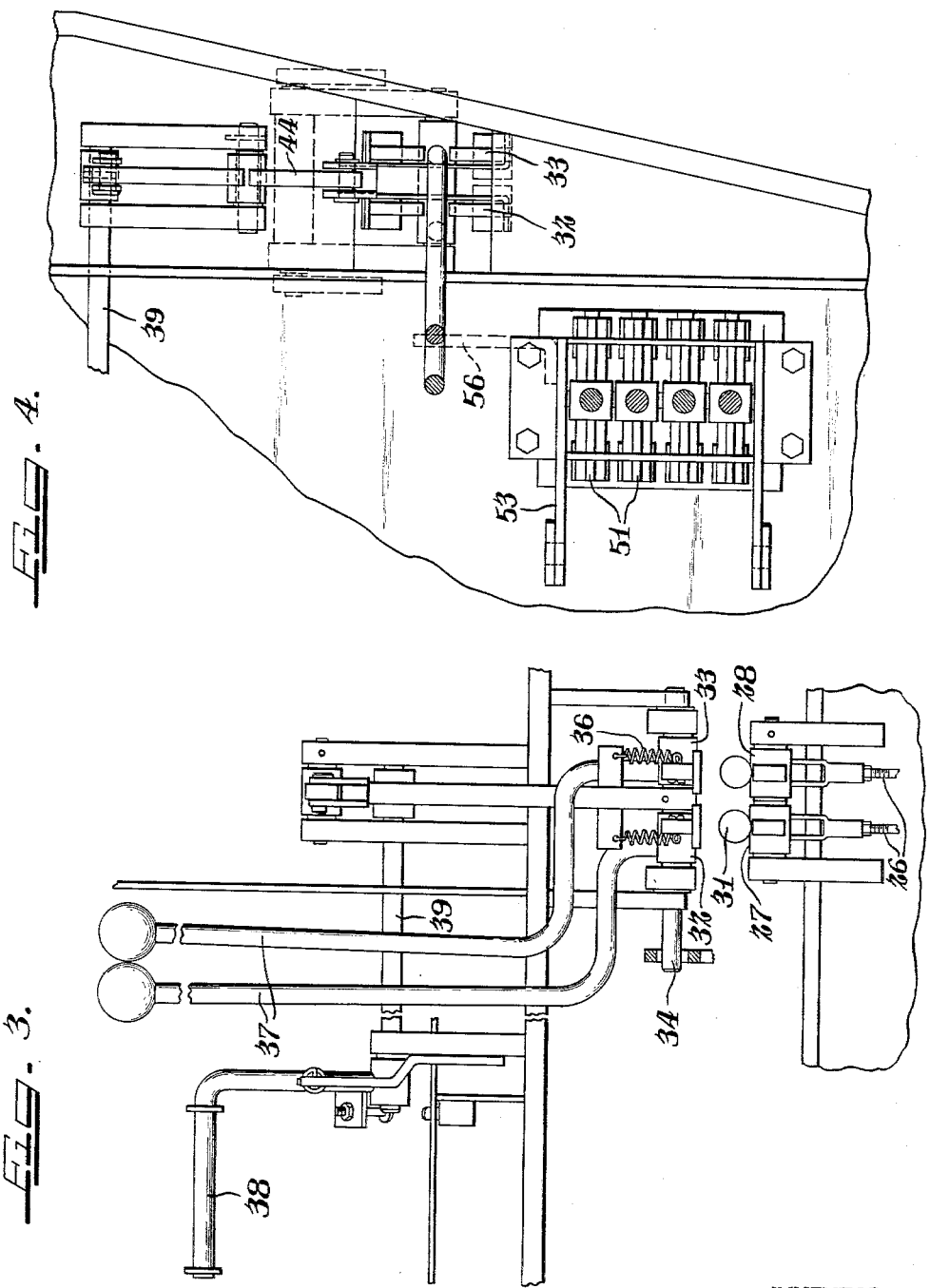

May 31, 1966        J. R. SCHUETZ        3,253,669
TRANSMISSION AND LEVELING CONTROLS FOR VEHICLES
Filed April 13, 1964        3 Sheets-Sheet 3
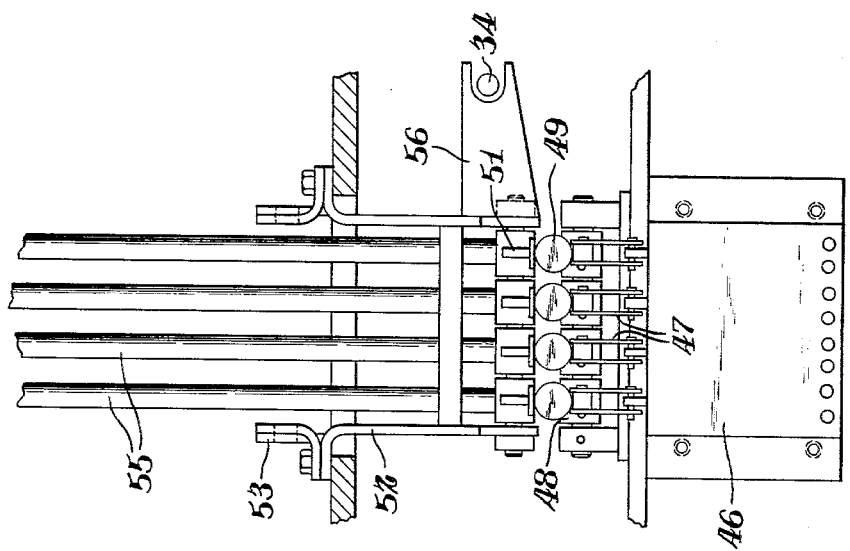
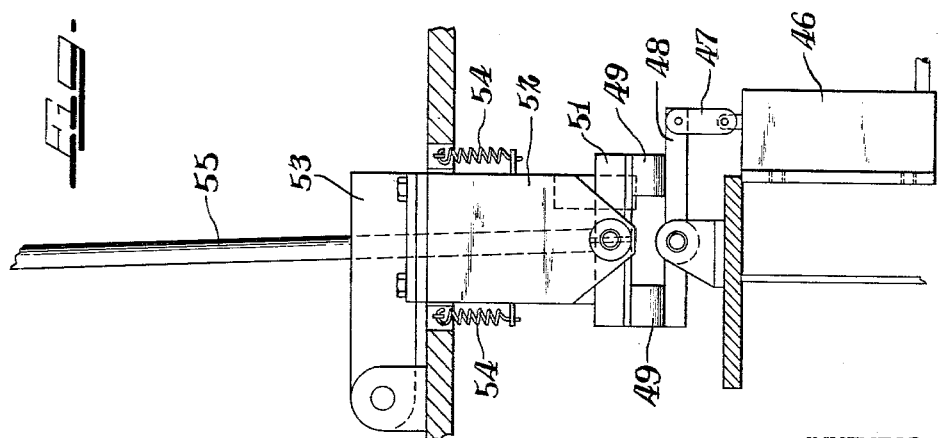
INVENTOR.
JOHN R. SCHUETZ
BY
Bair Freeman & Molinare
Attys.

United States Patent Office 3,253,669
Patented May 31, 1966

3,253,669
TRANSMISSION AND LEVELING CONTROLS FOR VEHICLES
John R. Schuetz, Wausau, Wis., assignor to Drott Manufacturing Corporation, Milwaukee, Wis., a corporation of Wisconsin
Filed Apr. 13, 1964, Ser. No. 359,075
7 Claims. (Cl. 180—41)

This invention relates to transmission and leveling controls for vehicles and more particularly to a mechanism for transferring control movements from the upper to the lower parts of a self-propelled vehicle whose upper and lower parts are relatively rotatable.

It has recently been proposed to provide material-handling apparatus including a lower frame supported on wheels which directly engage the ground or which may carry tracks to engage the ground and with the engine and transmission parts mounted on the lower frame. An upper frame is mounted on the lower frame for turning thereon about a vertical axis and carries the material-handling mechanism, such as a shovel or the like, together with controls for the engine and transmission and for leveling apparatus attached to the wheels.

One of the problems in apparatus of this type is the transfer of control movements from operating levers or pedals on the upper frame to the engine transmission leveling apparatus and the like on the lower frame. Hydraulic or electric controls are expensive and further complicate an already complex multiple swivel and collector ring assembly necessary for the transfer of power from the engine to the material-handling mechanism on the upper frame.

It is accordingly an object of the present invention to provide a transmission and leveling control for vehicles in which mechanical connections are provided between control levers on the upper frame and mechanisms to be controlled on the lower frame and which may be displaced from the axis of relative rotation of the frames.

According to a feature of the invention, the connections are provided by mating rocker bars on the respective frames which register in one relative angular position of the frames.

Another object is to provide a transmission and leveling control in which one set of the rocker bars on one of the frames are movable bodily toward and away from the other set of rocker bars so that the rocker bars will clear each other during relative rotation of the frames and can be moved into operative engagement with each other when control movements are to be effected.

Preferably, movement of such one set of rocker bars is controlled by a foot pedal which may also be utilized to effect other control operations in connection with operation of the vehicle.

The above and other objects and features of the invention will be more readily apparent from the following description when read in connection with the accompanying drawing in which:

FIG. 3 is a view similar to FIG. 2 looking from the right therein;

FIG. 4 is a partial top plan view illustrating a portion of the control mechanism;

FIG. 5 is a view similar to FIG. 2 illustrating a portion of the leveling controls; and FIG. 6 is a view of the leveling controls looking from the right in FIG. 5.

Figure 1:
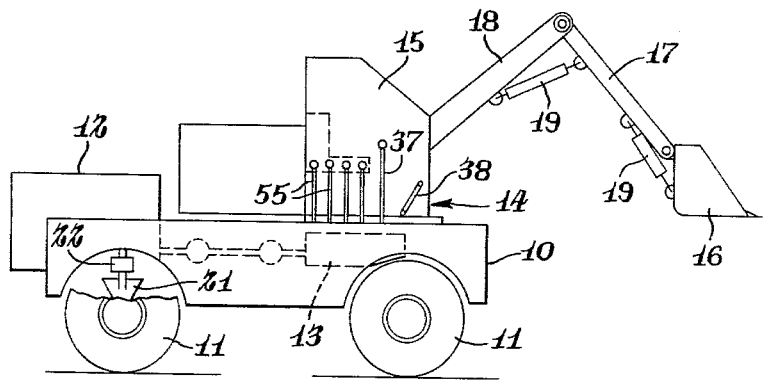
FIG. 1 is a side elevation more or less diagrammatic of a vehicle equipped with controls embodying the present invention.

The controls of the present invention may be applied to a vehicle as generally indicated in FIG. 1 having a lower frame 10 supported on wheels 11, at least two of which may be steerable. The vehicle is powered by an engine 12 which drives the wheels through a shiftable transmission indicated at 13 and which may also drive one or more hydraulic pumps to supply operating power to the material-handling mechanisms.

The vehicle is completed by an upper frame 14 which is mounted on the lower frame for turning movement about a vertical axis. The upper frame carries an operator's cab 15 in which the various controls are mounted and also carries the material-handling mechanism. As illustrated, the material-handling mechanism is a bucket 16 supported on a forearm 17 and a base arm 18 which is mounted for pivotal movement about a horizontal axis on the upper frame. The arms and bucket may be controlled by hydraulic cylinders 19 controlled by the operator in the usual manner, and the operator may also control turning of the upper frame relative to the lower frame as well as various movements of the vehicle.

In the vehicle as illustrated, the wheels 11 are connected to the frame through parallel horizontal links, one of which is shown at 21, and may be moved vertically to level the vehicle through hydraulic cylinders 22 connecting the links to the frame. This leveling mechanism is more particularly described and claimed in applicant's copending application, Serial No. 312,643, filed September 30, 1963.

Figure 2:
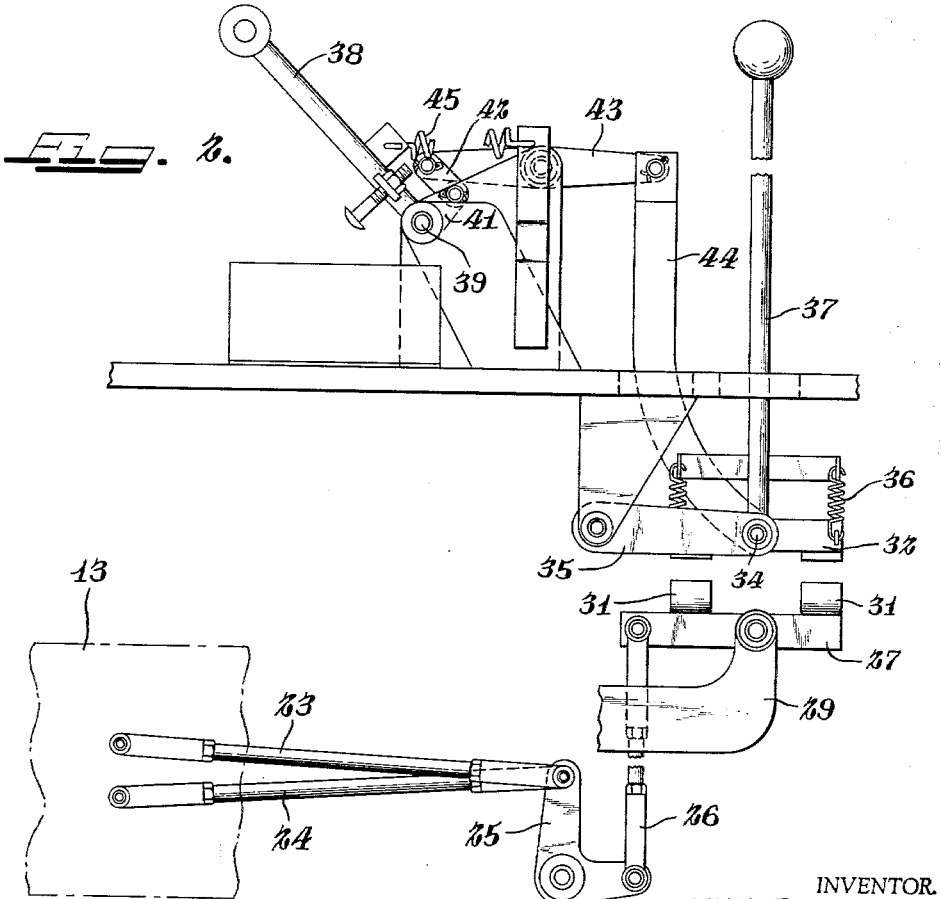
FIG. 2 is a diagrammatic view illustrating the transmission controls.

The transmission 13 is adapted to be selectively shifted to different driving ratios through control links 23 and 24 which are connected to shift levers or cranks on the transmission itself. As best seen in FIG. 2, the links 23 and 24 are connected to bell crank levers 25 which are pivoted on the lower frame and which are in turn connected through links 26 to rocker arms 27 and 28. The rocker arms 27 and 28 are pivoted intermediate their ends on a supporting bracket 29 and carry adjacent to their ends short cylindrical pieces 31 for contact with cooperating upper rocker arms 32 and 33 respectively.

The upper rocker arms 32 and 33 are pivoted intermediate their ends on an elongated shaft 34 which is carried by generally horizontal links 35 pivoted on the upper frame. Springs 36 connected to the rocker arms 32 and 33 normally urge them upwardly to the position shown in FIGS. 2 and 3 where they are spaced above and out of contact with the lower rocker arms. In this position the upper rocker arms will clear the lower rocker arms even though the lower rocker arms may be tilted from their horizontal position shown to avoid interference during relative rotation of the upper and lower frames. The upper rocker arms are connected respectively to operating levers 37 which are positioned in the operator's compartment for convenient movement by the operator to effect shifting of the transmission.

In order to move the upper rocker arms downwardly into operative engagement with the lower rocker arms, a foot pedal 38 is provided in the operator's compartment to be depressed conveniently by the operator's foot when desired. This foot pedal may perform any other necessary control functions in addition to movement of the upper rocker arms and may be operated in the manner of the usual clutch pedal in an automotive vehicle. As shown the foot pedal 38 is connected to a cross shaft 39 supported in bearings on the upper frame member and to which an operating arm 41 is secured. The operating arm 41 is connected through a link 42 to one end of a lever 43 which is pivoted intermediate its ends and which is connected through a second link 44 to the shaft 34 to shift it vertically. The arm 41 and link 42 act in the manner of a toggle linkage to straighten out when the foot pedal is depressed, thereby to rock the lever 43 clockwise and move the shaft 34 downwardly to bring the upper rocker arms 32 and 33 into engagement with the lower rocker arms 27 and 28 respectively. With the rocker arms in operative engagement, the levers 37 may be selectively moved to shift the links 23 or 24 as desired to shift the transmission to the desired driving ratio. When the foot pedal 38 is released, it is returned by a spring 45 and at the same time the shaft 34 will be elevated by the springs 36 to raise the upper rocker arms out of engagement with the lower rocker arms and in a position to clear the same when the upper and lower frames are turned relative to each other.

It will be understood that the rocker arms are positioned at a point spaced from the axis of rotation of the upper and lower frames so that they will register in only one relative angular position of the upper and lower frames. This may be either the position shown in FIG. 1 in which the bucket projects over the back end of the lower frame and constitutes the normal working position or could be a position reversed 180° from that shown in FIG. 1 which is the normal transport position. In normal use of an apparatus as shown, changes in speed ratio are required to be effected only in one or the other of these positions depending upon the character of the vehicle.

The leveling control cylinders 22 are controlled by a valve assembly indicated at 46 in FIG. 5 and which may contain four individual valves connected respectively to the individual cylinders 22. These valves are controlled by a rocker arm assembly generally similar to that provided for controlling the transmission. As best seen in FIGS. 5 and 6, each of the valves is connected through a link 47 to a rocker arm 48 which is pivoted intermediate its ends on the lower frame and which carries cylindrical end contact pieces 49 similar to the members 31 of FIGS. 1 to 3. The lower rocker arms are adapted to be operatively engaged respectively by upper rocker arms 51 which are pivoted intermediate their ends in a vertically movable frame 52. The frame 52 as best seen in FIG. 5 is supported on horizontally extending links 53 pivoted on the upper frame and is normally urged upwardly by springs 54. The rocker arms 51 are respectively connected to operating levers 55 which are positioned in the operator's compartment for convenient access to the operator.

To move the frame 52 downwardly it carries a bracket 56 which projects outwardly from one side thereof and terminates in a yoke portion straddling the shaft 34 as best seen in FIGS. 4 and 6. The frame 52 is normally elevated to raise the upper rocker arms 51 above the lower rocker arms 48 so that they will clear upon relative rotation of the upper and lower frames but will be moved downwardly to the position shown in FIGS. 5 and 6 when the shaft 34 is moved downwardly by depression of the pedal 38. It will be understood that the rocker arm assembly for control of the leveling cylinders is so positioned on the upper and lower frames that the rocker arms 48 and 51 will be in registration when the rocker arms 27, 28, 32 and 33 are in registration for control of the transmission. Thus in the control position the leveling cylinders may be individually controlled by the operator to level the frame for proper ground working operations, and at the same time the transmission may be controlled to vary the driving ratio.

While one embodiment of the invention has been shown and described in detail, it will be understood that this is illustrative only and is not to be taken as a definition of the scope of the invention, reference being had for this purpose to the appended claims.

What is claimed is:

1. In combination with a vehicle having a lower frame, wheels supporting the lower frame, an engine mounted on the lower frame, a transmission connecting the engine to the wheels and shiftable to produce different driving conditions, and an upper frame mounted on the lower frame for turning about a vertical axis, control means for the transmission comprising a first rock bar mounted on the lower frame for rocking about a central axis and connected to the transmission to shift it, a second rock bar mounted on the upper frame for rocking about a central axis and in face to face registration with the first rock bar in one relative angular position of the upper and lower frames, and a control lever connected to the second rock bar to rock it thereby to shift the transmission.

2. The construction of claim 1 including means mounting the second rock bar for movement toward and away from the first rock bar, spring means urging the second rock bar away from the first rock bar so that the upper frame can turn on the lower frame without interference, and a manually operable control on the upper frame connected to the second rock bar to move it into engagement with the first rock bar.

3. In combination with a vehicle having a lower frame, wheels supporting the lower frame, an engine mounted on the lower frame, a transmission connecting the engine to the wheels and shiftable to produce different driving conditions, and an upper frame mounted on the lower frame for turning about a vertical axis, control means for the transmission comprising a first pivot shaft mounted on the lower frame, a plurality of first rock bars pivoted on the first shaft, the first rock bars being connected to the transmission to shift it, a second pivot shaft, a plurality of second rock bars pivoted on the second shaft and in face to face registration with the first rock bars respectively in one relative angular position of the upper and lower frames, a plurality of control levers connected to the second rock bars respectively, links pivoted to the second pivot shaft and to the upper frame supporting the second shaft for movement on the frame toward and away from the first shaft, resilient means urging the second shaft away from the first shaft, and a pedal on the upper frame connected to the second shaft to move it toward the first shaft thereby to bring the first and second rock bars into engagement.

4. In combination with a vehicle having a lower frame, wheels, movably connected to the lower frame to support it, fluid motors connecting the frame to the wheels to raise and lower the wheels relative to the frame, and an upper frame mounted on the lower frame for turning about a vertical axis, control means for the fluid motors comprising a plurality of first rock bars mounted on the lower frame, control means for the fluid motors connected respectively to the rock bars, a plurality of second rock bars mounted on the upper frame for rocking about a central axis and in face to face registration with the first rock bars respectively when the upper and lower frames are in one relative angular position, means mounting the second rock bars for movement toward and away from the first rock bars, resilient means urging the second rock bars away from the first rock bars, and a pedal mounted on the upper frame connected to the second rock bars to move them into engagement with the first rock bars.

5. In combination with a vehicle having a lower frame, wheels movably connected to the lower frame to support it, fluid motors connecting the frame to the wheels to raise and lower the wheels relative to the frame, an engine mounted on the lower frame, a transmission drivably connecting the engine to the wheels and shiftable to produce different driving conditions, and an upper frame mounted on the lower frame for turning about a vertical axis, control means comprising a first rock bar pivoted on the lower frame for rocking about a central axis and connected to the transmission to shift it, a second rock bar pivoted on the upper frame and in face to face registration with the first rock bar in one relative angular position of the upper and lower frames, a control lever connected to the second rock bar to rock it, a plurality of third rock bars pivoted on the lower frame, control means for the fluid motors connected respectively to the third rock bars, a plurality of fourth rock bars pivoted on the upper frame and in face to face registration with the third rock bars respectively in one relative angular position of the upper and lower frames, and control levers connected to the fourth rock bars to rock them.

6. The construction of claim 5 in which the second and fourth rock bars are mounted for bodily movement toward and away from the first and third rock bars respectively, resilient means urging the second and fourth rock bars away from the first and third rock bars, and a pedal mounted on the upper frame and connected to the second and fourth rock bars to move them toward and into operative engagement with the first and third rock bars respectively.

7. The construction of claim 6 in which the second rock bar is pivoted on a shaft, links connect the shaft to the upper frame for movement thereon, the fourth rock bars are pivoted on a second shaft at right angles to the first named shaft, links connect the second shaft to the upper frame for movement thereon, the pedal is connected to one of the shafts to move it, and the shafts are connected for simultaneous movement when the pedal is operated.

References Cited by the Examiner
UNITED STATES PATENTS

| | | | |
|---|---|---|---|
| 1,879,218 | 9/1932 | Hanson | 180—6.58 |
| 2,855,110 | 10/1958 | Prichard | 180—6.58 |

BENJAMIN HERSH, *Primary Examiner.*

W. A. MARCONTELL, *Assistant Examiner.*